United States Patent
Elenich et al.

(10) Patent No.: US 6,904,783 B2
(45) Date of Patent: Jun. 14, 2005

(54) SYSTEM AND METHOD FOR DETECTING FAULTY FUEL TANK LEVEL SENSOR

(75) Inventors: David Elenich, Regensburg (DE); Dominique Salafia, Tournefeuille (FR)

(73) Assignee: Siemens VDO Automotive Corporation, Auburn Hills ( * ) Notice: Subject to any disclaimer, the term of this patent is extended or adjusted under 35 U.S.C. 154(b) by 0 days.

(21) Appl. No.: 10/349,795

(22) Filed: Jan. 23, 2003

(65) Prior Publication Data

US 2003/0136173 A1 Jul. 24, 2003

Related U.S. Application Data

(60) Provisional application No. 60/353,657, filed on Jan. 23, 2002.

(51) Int. Cl.[7] .............................................. G01F 19/00
(52) U.S. Cl. ........................................ 73/1.73; 73/304
(58) Field of Search .............................. 73/1.73, 304 R, 73/290 R, 304 C; 340/620; 702/100, 116; 364/551.01, 571.01, 571.02, 571.04, 571.05

(56) References Cited

U.S. PATENT DOCUMENTS

| | | | | |
|---|---|---|---|---|
| 5,148,378 A | * | 9/1992 | Shibayama et al. | 364/571.07 |
| 5,235,527 A | * | 8/1993 | Ogawa et al. | 364/571.05 |
| 5,345,179 A | * | 9/1994 | Habashy et al. | 324/338 |
| 5,621,169 A | * | 4/1997 | Harris et al. | 73/152.18 |
| 5,665,895 A | * | 9/1997 | Hart et al. | 73/1.73 |
| 5,785,100 A | * | 7/1998 | Showalter et al. | 141/198 |
| 6,016,465 A | * | 1/2000 | Kelly | 702/116 |
| 6,200,443 B1 | * | 3/2001 | Shen et al. | 204/401 |
| 6,253,607 B1 | * | 7/2001 | Dau | 73/290 R |
| 6,332,358 B1 | * | 12/2001 | Atkinson | 73/304 R |
| 6,336,362 B1 | * | 1/2002 | Duenas | 73/313 |

* cited by examiner

Primary Examiner—Hezron Williams
Assistant Examiner—Katina Wilson

(57) ABSTRACT

A system and method for detecting a stuck or malfunctioning fuel tank level sensor calculates an estimated fuel tank level sensor value and compares the estimated sensor value with the actual sensor value. Upper and lower threshold values may also be determined along with the estimated value. If the actual sensor value falls outside the threshold values, the sensor is considered faulty and an error signal is set in the system. The system also compares the actual sensor value with a reference sensor value to detect whether the fault is due to a stuck sensor or due to a different type of sensor malfunction.

19 Claims, 4 Drawing Sheets

SYSTEM AND METHOD FOR DETECTING FAULTY FUEL TANK LEVEL SENSOR

REFERENCE TO RELATED APPLICATIONS

This application claims the benefit of U.S. Provisional Appln. No. 60/353,657, filed Jan. 23, 2002.

TECHNICAL FIELD

The present invention relates to fuel tank level sensors, and more particularly to a system that detect a faulty fuel tank level sensor based on the sensor output.

BACKGROUND OF THE INVENTION

Monitoring the amount of fuel in a fuel tank is critical for vehicle operation because there are many functions within an engine that rely on fuel tank level information. The fuel level is normally monitored by a fuel tank level sensor that outputs a value corresponding to the current fuel level. As fuel is consumed, the value output by the sensor goes down. If the fuel tank level sensor sticks or otherwise malfunctions, however, it cannot output a signal that accurately reflects the fuel level in the tank. An incorrect fuel tank level sensor value may adversely affect other engine functions. The operation of the fuel tank level sensor is controlled by an algorithm.

Currently known algorithms are designed to diagnose electrical errors detected by the sensor (e.g., a short-to-battery error, short-to-ground error, or open circuit) or a stuck sensor. However, these algorithms can identify only a limited range of possible sensor malfunctions, leaving other sensor malfunctions undetectable.

There is a desire for a system that can detect a fuel tank level sensor error more reliably.

SUMMARY OF THE INVENTION

The present invention is directed to a system and method for detecting a stuck or malfunctioning fuel tank level sensor. The invention monitors the fuel tank level sensor signal output and calculates the fuel consumed by the engine. From this information, the invention can calculate an estimated fuel tank level sensor value and compare this estimated sensor value with the actual sensor value. Upper and lower threshold values may also be determined along with the estimated value. If the actual sensor value falls outside the threshold values, the sensor is considered faulty and an error signal is set in the system. The actual sensor value may be filtered before being compared with the estimated sensor value to prevent noise in the actual sensor signal from causing false detection of sensor errors.

In one embodiment, the system also checks whether the actual sensor value falls outside a window based on a reference sensor value to determine whether a given faulty sensor output is due to a stuck sensor or another type of malfunction. By distinguishing between different types of sensor faults, the invention provides more robust sensor fault detect and can even detect faults that currently known algorithms miss.

DETAILED DESCRIPTION OF THE EMBODIMENTS

Generally, the invention provides a more robust diagnosis of fuel tank level sensor operation by monitoring fuel consumption as well as the operation of the fuel tank level sensor itself. The invention uses an algorithm that takes fuel consumption into account along with the sensor output versus time to detect malfunction of the sensor. The algorithm itself can be executed by any known processors. The inventive algorithm can distinguish between a stuck signal and an implausible signal to provide additional information for identifying a root cause of a given detected fault.

Figure 1:
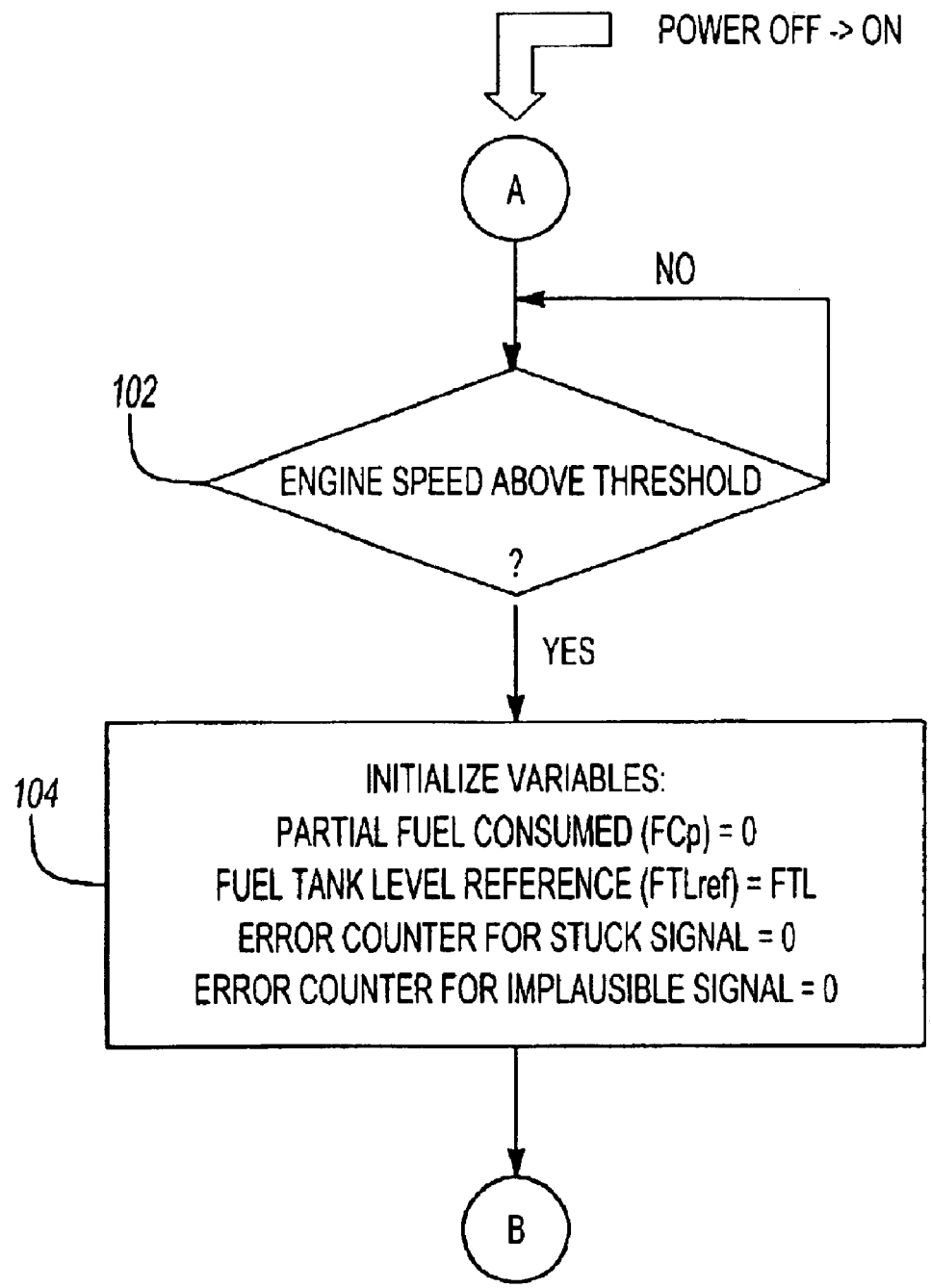
FIG. 1 is a flowchart illustrating an initialization process according to one embodiment of the invention.

FIG. 1 is a flowchart showing an initialization process 100 that occurs when an engine is started. The system relies on two main variables to monitor the fuel tank level sensor operation: a partial fuel consumption variable (FCp) and a fuel tank level reference (FTLref). The processor first checks whether the engine speed is above a predetermined threshold (block 102). If not, the process continues to check the engine speed as it rises. In one embodiment, the predetermined threshold provides a condition that causes the algorithm to run only when the engine is running and the vehicle is moving. The predetermined threshold ensures that the algorithm is not applied while the engine is not running. If the engine is idle and the vehicle is not moving, a refueling or fuel draining event may occur; thus, the algorithm is not applied during this condition to avoid misdetection of a fuel sensor malfunction.

Once the engine speed reaches a predetermined threshold, all of the variables and one or more error counters are initialized (block 104). In one embodiment, two error counters are provided, one for detecting a stuck signal and another for detecting an implausible signal. The partial fuel consumption variable (FCp) and the error counters are set to zero, while the fuel tank level reference (FTLref) is set to the current actual fuel tank level. In one embodiment, the actual fuel tank level is filtered before being evaluated by the algorithm throughout the detection process to prevent noise from causing incorrect fault detections. In this description, the term "actual fuel tank level" will be used to refer to both the actual and the filtered value; either or both values can be used without departing from the scope of the invention. The error counters are re-initialized back to zero at the start of every cycle, as will be explained below.

Figure 2:
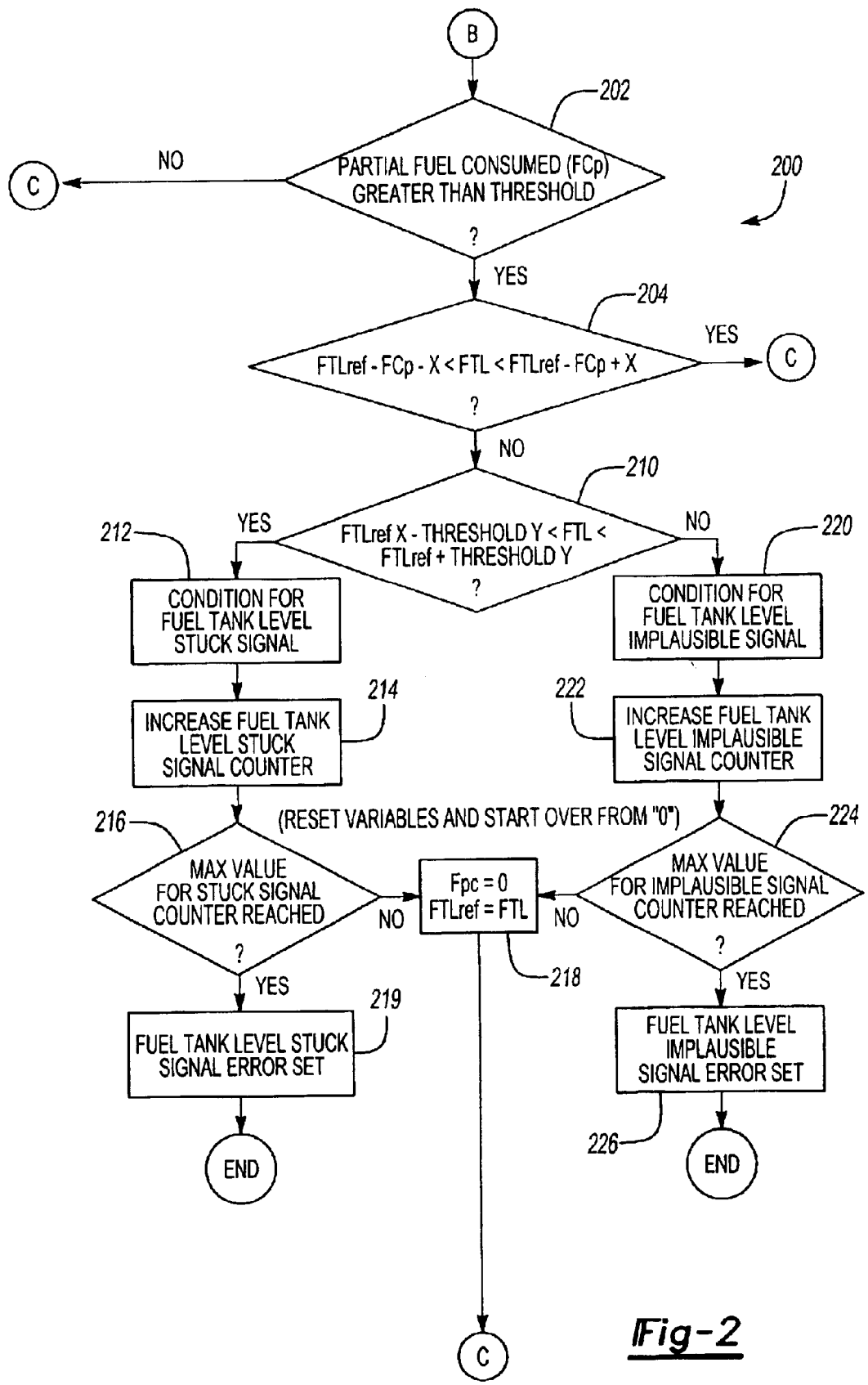
FIG. 2 is a flowchart illustrating a portion of the malfunction determination process according to one embodiment of the invention.
Figure 3:
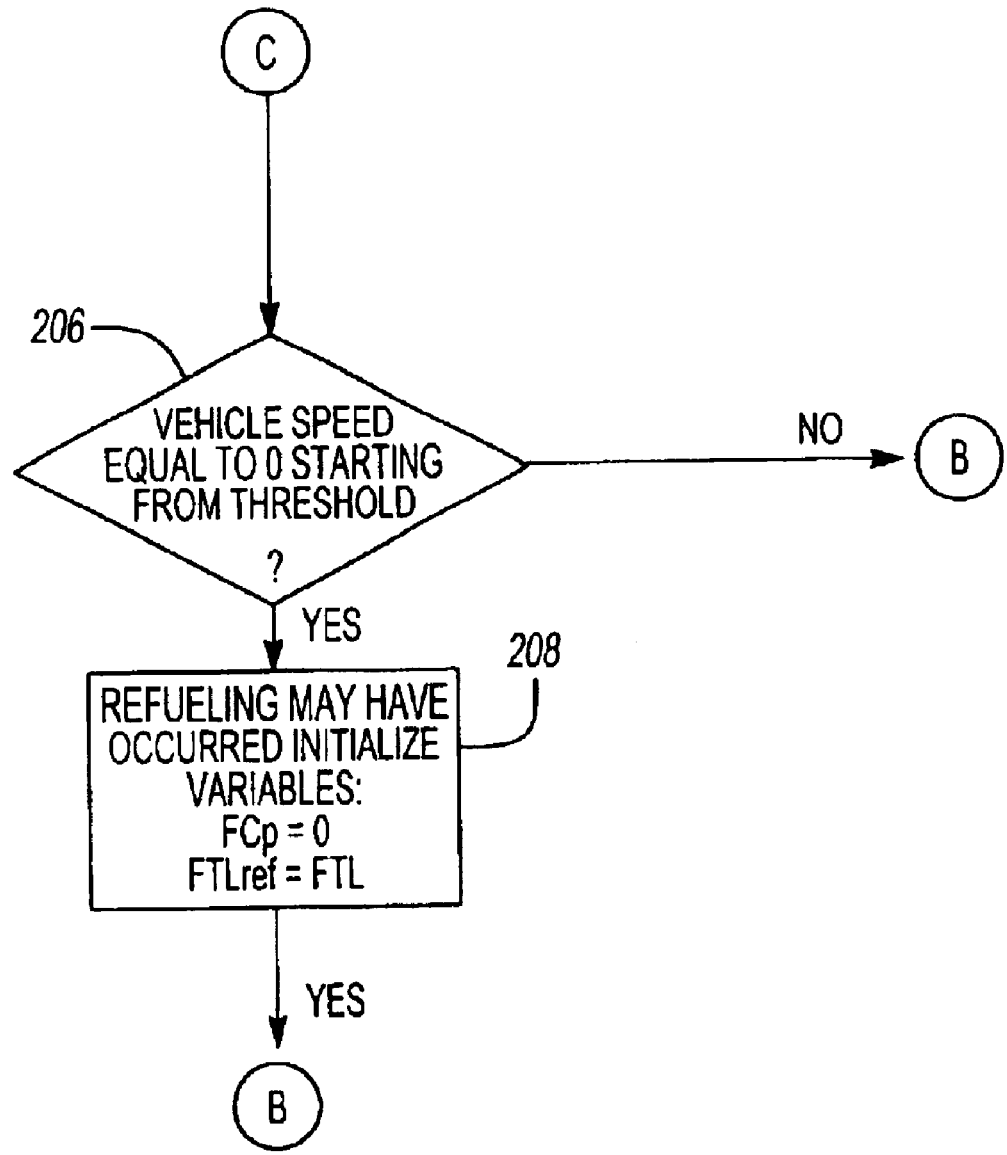
FIG. 3 is a flowchart illustrating another portion of the malfunction determination process according to one embodiment of the invention.

FIGS. 2 and 3 illustrate a fuel tank level sensor monitoring process 200 according to one embodiment of the invention. The process 200 relies upon several calibratable thresholds that depend on the specific characteristics of the vehicle components being monitored (e.g., engine size, fuel tank size, consumption speed, ambient temperatures, etc.). These thresholds can be determined empirically and are within the capabilities of one of ordinary skill in the art. Once the variables and error counters have been initialized 100, the partial fuel consumption variable FCp is checked to determine whether the partial fuel consumption is greater than a first threshold.

If the partial fuel consumption variable FCp is less than the threshold (block 202), indicating that there is not enough fuel consumption to diagnose a faulty sensor, the vehicle speed is checked to see whether the speed has stayed at zero with the engine running during a selected time threshold (block 206). The time threshold is selected to be short enough so that no refueling or fuel drain events can occur within the time threshold but long enough to ensure that the inventive algorithm is able to run to completion. Because these events may occur during, for example, refueling or fuel drain operation, it will not be clear whether variations in the actual sensor value FTL are due to sensor malfunctions or simply due to normal refueling. To reset the system, the fuel consumption and reference fuel tank level variables FCp, FTLref are initialized again (block 208) before the system returns to normal sensor monitoring (block 202).

If the partial fuel consumption FCp is greater than a threshold Z, indicating that enough fuel has been consumed to start sensor diagnosis, the system compares the actual value of the fuel tank level (FTL) within an upper and lower bound of value X calculated from the reference fuel tank level FTLref minus the partial fuel consumption FCp (block 204). Threshold X is the threshold for the estimated fuel tank level FTLref-FCp. The estimated sensor value FTLref–FCp estimates the fuel tank level based on fuel consumption; thus, the actual fuel tank level, as indicated by the actual sensor value FTL, should be close to the estimated fuel tank level sensor value within the window provided by the threshold X. If the estimated fuel tank level is within the window set by the threshold X and the estimated sensor value FTLref–FCp, it indicates that the actual sensor value FTL is an accurate value and reflects the fuel being consumed by the engine. The system will then return to block 202 and continue to monitor the actual fuel tank level signal FTL without incident.

FIG. 3 is a graph illustrating the relationship between the reference fuel tank signal FTLref, the actual fuel tank level sensor signal FTL, and the fuel consumption value FCp. As can be seen in FIG. 3, the actual sensor value FTL and the estimated sensor value FTLref–FCp will remain within the window set by threshold X on either side of the estimated sensor value FTLref–FCp.

Referring back to FIG. 2, if the fuel tank sensor is stuck or malfunctioning, the estimated fuel tank level sensor value will be outside the actual fuel tank level sensor value even when the additional threshold X is taken into account. If this occurs, the process 200 then proceeds to determine whether the fuel tank level sensor is stuck or whether it is implausible. To check whether the fuel tank level sensor is stuck, the actual sensor value FTL is compared with the reference fuel tank level FTLref plus or minus a selected threshold Y (block 210). The threshold Y is small because if the signal is stuck, it will remain the same value as FTLref; as a result, the difference between the actual value FTL and the reference value FTLref should be minimal.

Figure 4:
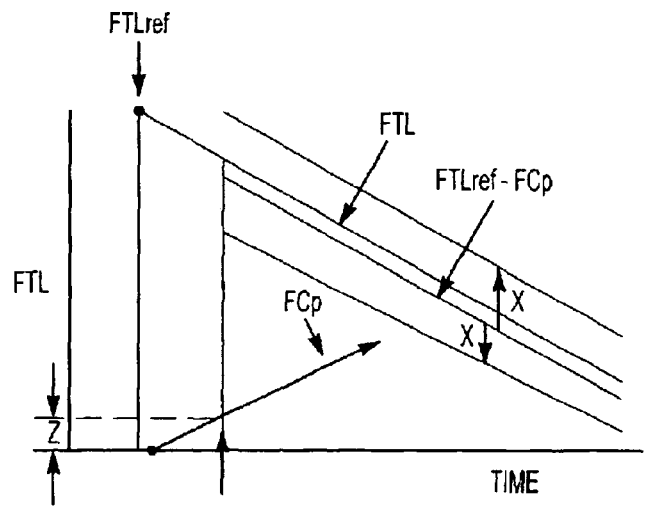
FIG. 4 is a graph illustrating a normal sensor signal condition.

If the fuel tank level sensor is stuck, the actual sensor value FTL will erroneously be the same as the reference sensor value FTLref because the stuck sensor will not be able to go down as fuel is consumed. The process will then indicate that the fuel tank level sensor is stuck (block 212) and increment the error counter corresponding with a stuck fuel tank level sensor condition (block 214). As shown in FIG. 4, a stuck signal FTL will remain constant over time, eventually causing the signal FTL to fall outside the window around the estimated sensor value FTLref–FCp. Note that even with this error, the actual sensor value FTL will still fall near the reference sensor value FTLref within a threshold value Y, which is the threshold for a stuck signal (block 218).

The algorithm then checks whether the stuck signal error counter has reached its maximum value (block 216). If not, the algorithm resets the fuel consumption value FCp to zero and the reference fuel tank level sensor value to the current, actual fuel tank level sensor value (block 218). The algorithm then begins another cycle of monitoring (block 202). Resetting these values allows the algorithm to focus on incremental changes in the fuel tank level. If, however, the stuck signal error counter has reached its maximum value (block 216), the algorithm sets an error signal indicating that the fuel tank level sensor is stuck (block 219).

A malfunctioning sensor, as opposed to a stuck sensor, will cause the actual fuel tank level sensor value FTL to drift too far from the estimated fuel tank level(block 210), creating an implausible actual sensor value FTL. As noted above, the reference sensor value FTLref is reset during each cycle to equal the actual sensor value FTL (block 218). If the actual sensor value FTL changes dramatically between cycles, beyond the threshold Y, then the actual sensor value FTL is clearly implausible.

Figure 5:
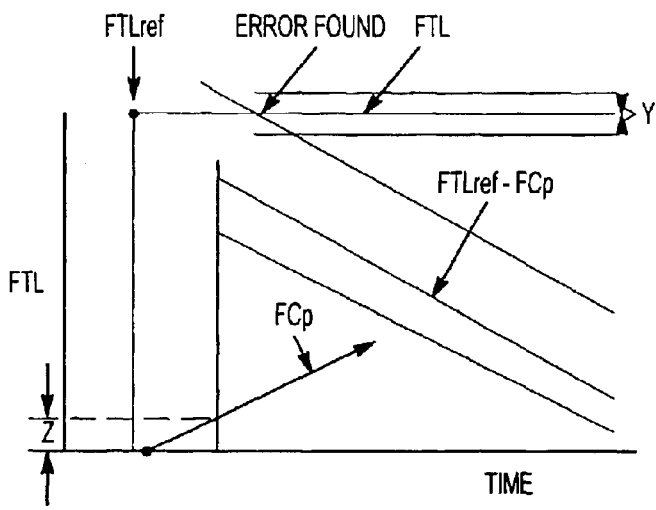
FIG. 5 is a graph illustrating a stuck sensor signal condition.
Figure 6:
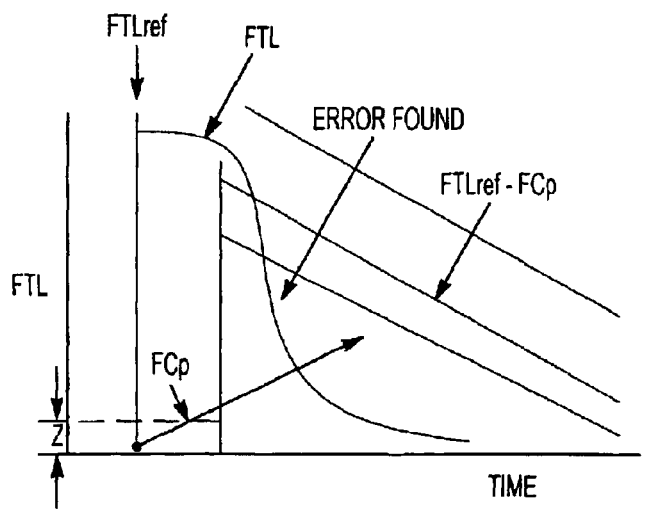
FIG. 6 is a graph illustrating an implausible sensor signal condition.

As shown in FIG. 5, a dramatic change in the actual sensor value FTL will cause the FTL to quickly fall outside the window around the estimated sensor value FTLref–FCp.

In such a case, the algorithm indicates that the actual fuel tank level sensor value FTL is implausible (block 220) and increment the error counter corresponding to implausible signal detection (block 222). If not, the algorithm resets the fuel consumption value FCp to zero and the reference fuel tank level sensor value to the current, actual fuel tank level sensor value (block 218), as noted above, and starts another monitoring cycle (block 202). If the implausible signal error counter has reached its maximum value (block 224), the algorithm sets an error signal indicating that the fuel tank level sensor is generating an implausible signal (block 226).

In both stuck signal and implausible signal cases, the error counters minimizes false alarms by requiring the actual fuel tank level sensor value FTL to output a stuck or implausible value for a minimum period of time. This ensures that brief, transient anomalies in the actual fuel tank sensor value FTL will not cause the monitoring algorithm to falsely indicate a stuck sensor. Note that the algorithm can be made more robust to detect a stuck sensor that occurs later in the process shown in FIGS. 2 and 3, as opposed to a stuck sensor that occurs at the start of the process shown in FIG. 1, by setting FTLref equal to FTL each time a variation in the FTL value reaches a defined threshold (instead of or in addition to every sensing cycle) and updating the fuel consumption value FCp based on the new FTLref by subtracting the difference between the old and new FTLref values from FCp. Other variations are within the capabilities of those of ordinary skill in the art without departing from the scope of the invention.

As a result, the present invention is able to detect multiple types of sensor errors and to distinguish between a stuck sensor and other sensor malfunctions. By allowing detection of malfunctions other than a stuck sensor, the inventive system provides a more accurate, robust way to monitor sensor operation. Although the above example focuses on a fuel tank level sensor, the invention may be incorporated into any fluid level sensing system where the fluid level changes over time.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A fluid level sensor monitoring method, comprising:
   monitoring an actual sensor output from the fluid level sensor;
   calculating an estimated sensor output based on a fluid consumption variable value by calculating a difference between a reference sensor value and the fluid consumption variable to obtain the estimated sensor output;
   setting the reference sensor value equal to the actual sensor output to obtain a new reference sensor value if the reference sensor value varies by a predetermined threshold; and
   indicating a sensor malfunction if a difference between the actual sensor output and the estimated sensor output is outside a first threshold.

2. The method of claim 1, wherein the reference sensor value is the actual sensor output from a previous sensing cycle.

3. The method of claim 1, further comprising:
   subtracting the new reference sensor value from the reference sensor value to obtain a reference sensor value difference; and
   subtracting the reference sensor value difference from the fluid consumption variable to obtain an updated fluid consumption variable.

4. A fluid level sensor monitoring method, comprising:
   monitoring an actual sensor output from the fluid level sensor;
   calculating an estimated sensor output based on a fluid consumption variable value;
   indicating a sensor malfunction if a difference between the actual sensor output and the estimated sensor output is outside a first threshold;
   comparing the actual sensor output with a reference sensor value; and
   distinguishing between a first sensor malfunction and a second sensor malfunction based on the comparing step.

5. The method of claim 4, wherein the first sensor malfunction corresponds to a stuck condition and the second sensor malfunction corresponds to a defective condition,
   wherein a stuck signal error is indicated when a difference between the actual sensor value and the reference sensor value is inside a second threshold, and
   wherein an implausible signal error is indicated when the difference between the actual sensor value and the reference sensor value is outside the second threshold.

6. The method of claim 5, further comprising:
   incrementing a first counter when the stuck condition is detected;
   incrementing a second counter when the defective condition is detected;
   indicating the stuck signal error if the first counter reaches a first counter threshold; and
   indicating the implausible signal error if the second counter reaches a second counter threshold.

7. A fluid level sensor monitoring method, comprising:
   monitoring an actual sensor output from the fluid level sensor;
   calculating an estimated sensor output based on a fluid consumption variable value;
   indicating a sensor malfunction if a difference between the actual sensor output and the estimated sensor output is outside a first threshold, wherein the indicating step comprises:
   incrementing a counter when the difference between the actual sensor output and the estimated sensor output is outside a first threshold; and
   indicating the sensor malfunction when the counter reaches a counter threshold.

8. A method of monitoring a fuel tank level sensor, comprising:
   monitoring an actual sensor output from the fuel tank level sensor;
   calculating a difference between to obtain a reference sensor value and a fuel consumption variable to obtain an estimated sensor output;
   indicating a sensor malfunction if a difference between the actual sensor output and the estimated sensor output is outside a first threshold; and
   indicating a stuck signal error, corresponding to a stuck condition, if a difference between the actual sensor value and the reference sensor value is inside a second threshold; and
   indicating an implausible signal error, corresponding to a defective condition, if the difference between the actual sensor value and the reference sensor value is outside the second threshold.

9. The method of claim 8, wherein the reference sensor value is the actual sensor output from a previous sensing cycle.

10. The method of claim 8, wherein the reference sensor value is set equal to the actual sensor output to obtain a new reference sensor value if the reference sensor value varies by a predetermined threshold.

11. The method of claim 10, further comprising:
    subtracting the new reference sensor value from the reference sensor value to obtain a reference sensor value difference; and
    subtracting the reference senior value difference from the fluid consumption variable to obtain an updated fluid consumption variable.

12. The method of claim 8, further comprising:
    incrementing a first counter when the stuck condition is detected;
    incrementing a second counter when the defective condition is detected;
    indicating tho stuck signal error if the first counter reaches a first counter threshold; and
    indicating the implausible signal error if the second counter reaches the second counter threshold.

13. A fluid level monitoring system, comprising:
    a fluid level sensor; and
    a processor coupled to the fluid level sensor, wherein the processor executes an algorithm comprising the steps of:
       monitoring an actual sensor output from the fluid level sensor;
       calculating a difference between a reference sensor value and a fluid consumption variable to obtain an estimated sensor output;
       setting the reference sensor value is equal to the actual sensor output to obtain a new reference sensor value if the reference sensor value vanes by a predetermined threshold, and
       indicating a sensor malfunction if a difference between the actual sensor output and the estimated sensor output is outside a first threshold.

14. The system of claim 13, wherein the processor uses the actual sensor value from a previous sensing cycle as the reference sensor value.

15. The method of claim 13, further comprising:
subtracting the new reference sensor value from the reference sensor value to obtain a reference sensor value difference; and
subtracting the reference sensor value difference from the fluid consumption variable to obtain an updated fluid consumption variable.

16. A fluid level monitoring system, comprising:
a fluid level sensor; and
a processor coupled to the fluid level sensor, wherein the processor executes an algorithm comprising the steps of:
monitoring an actual sensor output from the fluid level sensor;
calculating a difference between a reference sensor value and a fluid consumption variable to obtain an estimated sensor output; and
indicating a sensor malfunction if a difference between the actual sensor output and the estimated sensor output is outside a first threshold; comparing the actual sensor output with a reference sensor value; and
distinguishing between a first sensor malfunction and a second sensor malfunction based on the comparison.

17. The system of claim 16, wherein the first sensor malfunction corresponds to a stuck condition and the second sensor malfunction corresponds to a defective condition,
wherein a stuck signal error is indicated when a difference between the actual sensor value arid the reference sensor value is inside a second threshold, and
wherein an implausible signal error is indicated when the difference between the actual sensor value and the reference sensor value is outside the second threshold.

18. The system of claim 17, wherein the processor increments a first counter when the stuck condition is detected, increments a second counter when the defective condition is detected, indicates the stuck signal error if the first counter reaches a first counter threshold, and indicates the implausible signal error if the second counter reaches a second counter threshold.

19. A fluid level monitoring system, comprising:
a fluid level sensor; and
a processor coupled to the fluid level sensor, wherein the processor executes an algorithm comprising the steps of:
monitoring an actual sensor output from the fluid level sensor,
calculating a difference between a reference sensor value and a fluid consumption variable to obtain an estimated sensor output,
indicating a sensor malfunction if a difference between the actual sensor output and the estimated sensor output is outside a first threshold by incrementing a counter when the difference between the actual sensor output and the estimated sensor output is outside a first threshold and indicating the sensor malfunction when the counter reaches a counter threshold.

* * * * *